US008931458B2

(12) United States Patent
Dyess et al.

(10) Patent No.: US 8,931,458 B2
(45) Date of Patent: Jan. 13, 2015

(54) CARBURETOR AND METHODS THEREFOR

(75) Inventors: William Corey Dyess, Laramie, WY (US); Aaron Aldrich Hudlemeyer, Laramie, WY (US)

(73) Assignee: APT IP Holdings, LLC, Kansas City, MO (US)

( * ) Notice: Subject to any disclaimer, the term of this patent is extended or adjusted under 35 U.S.C. 154(b) by 712 days.

(21) Appl. No.: 12/913,629

(22) Filed: Oct. 27, 2010

(65) Prior Publication Data

US 2012/0001113 A1 Jan. 5, 2012

Related U.S. Application Data

(60) Provisional application No. 61/361,117, filed on Jul. 2, 2010.

(51) Int. Cl.
*F02M 9/06* (2006.01)
*F16K 3/00* (2006.01)
*F02M 19/08* (2006.01)

(52) U.S. Cl.
CPC ........... *F02M 19/081* (2013.01); *F02M 19/088* (2013.01)
USPC ........................... 123/434; 261/44.3; 251/326

(58) Field of Classification Search
USPC ............ 123/701, 702, 437, 439, 73 AD, 402; 261/44.3, DIG. 36, DIG. 37
See application file for complete search history.

(56) References Cited

U.S. PATENT DOCUMENTS 4,150,070 A 4/1979 Hashimoto et al.
4,221,747 A * 9/1980 Edmonston .................. 261/44.3
4,814,115 A * 3/1989 Hashimoto et al. .......... 261/44.3
4,926,059 A 5/1990 Edmonston
5,342,555 A 8/1994 Edmonston
5,538,673 A * 7/1996 Edmonston .................. 261/44.3
6,505,821 B1 * 1/2003 Edmonston .................. 261/44.3
2013/0206107 A1 * 8/2013 Dyess et al. .................. 123/434

FOREIGN PATENT DOCUMENTS

WO 00-20750 A1 4/2000

OTHER PUBLICATIONS

International Search Report and Written Opinion dated Jan. 2, 2012 for Int. Appl. No. PCT/US2011/039254, 9 pp.
Supplementary European Search Report for corresponding European Application No. 11801310, mailed Jan. 8, 2014.

* cited by examiner

*Primary Examiner* — Thomas Moulis
*Assistant Examiner* — Elizabeth Hadley
(74) *Attorney, Agent, or Firm* — Holland & Hart, LLP

(57) ABSTRACT

A carburetor having an inlet opening that includes a pair of concavities operative to direct air toward the metering rod of the carburetor. A carburetor having an inlet opening that includes an arcuate manifold adjacent to the inlet opening and in fluid communication with a fuel reservoir. A carburetor having a slide assembly that includes a positioning mechanism operative to adjust the position of the metering rod relative to the throttle slide. A throttle slide that includes a flow guide that bisects an arcuate relief on an underside thereof. A method for configuring the throat of a carburetor that includes an upper portion of a first diameter and a lower portion of a second diameter that is offset from the first diameter. The method comprises deriving an optimum size for the first and second diameters and the offset based on the pumping efficiency and operating parameters of the engine.

15 Claims, 9 Drawing Sheets

CARBURETOR AND METHODS THEREFOR

CROSS-REFERENCE TO RELATED APPLICATIONS

The present application claims the benefit of U.S. Provisional Application Ser. No. 61/361,117, filed Jul. 2, 2010, the disclosures of which are hereby incorporated by reference in their entirety.

BACKGROUND

Carburetors are reliable, robust mechanisms for efficiently metering fuel to an internal combustion engine. A carburetor meters the appropriate amount of fuel according to engine demand based on intake airflow to the engine. Generally, carburetors operate on the principle that as the velocity of airflow through a restriction increases, its pressure decreases. Carburetors are configured to take advantage of the pressure differential created between atmospheric pressure surrounding the carburetor and a low pressure region created inside the carburetor, usually by way of a venturi. As an engine draws air through the venture, the low pressure region created by the increasing air velocity meters a proportional amount of fuel into the intake airflow stream. As passive devices, carburetors are both reliable and robust, while thoroughly mixing fuel with incoming airflow which enhances efficient combustion.

While carburetors are simple and cost effective fuel delivery systems, modern emission requirements have limited the application of carburetors on newer products. Many applications have implemented electronic fuel injection in order to maintain precise control of fuel delivery, which allows catalytic converters to be used in an emissions reduction strategy. The introduction of electronic fuel injection has added complexity, cost, weight, and increased electronic load to modern engines. Fuel injection systems rely on a sensor network. The failure of any single sensor can drastically reduce the emissions performance of the fuel system.

In order to continue to benefit from the carburetor's advantages, improvements to traditional carburetor design are needed in order to ensure the carburetor's ability to meet emission requirements for modem engines.

SUMMARY

Provided herein is a carburetor for an internal combustion engine, comprising a body having an air inlet opening portion, an air outlet opening portion, and a throat portion extending therebetween. A fuel reservoir is in fluid communication with the throat portion and a slide assembly is movably disposed in the body for movement across the throat portion. The slide assembly includes a throttle slide and a metering rod extending across the throat portion and into the fuel reservoir. The air inlet opening includes a pair of concavities operative to direct airflow toward the metering rod. The concavities begin near a peripheral margin of the inlet opening portion and extend inward as the concavities approach the throat portion. The throat portion includes upper and lower portions and the concavities are adjacent the upper portion.

Also contemplated herein is a carburetor having an air inlet opening that includes a manifold, which may be in the form of an arcuate scoop, adjacent to and extending along a portion of a peripheral margin of the inlet opening portion. The manifold is in fluid communication with the fuel reservoir. The manifold has a volume that is proportional to the cross-sectional area of the throat portion. The throat portion includes upper and lower portions, and the manifold is adjacent the upper portion. This carburetor may also include an air inlet opening that includes a pair of concavities operative to direct airflow toward the metering rod that are located proximate either end of the manifold. Wherein the concavities begin near a peripheral margin of the inlet opening portion and extend inward as the concavities approach the throat portion.

In another embodiment, a carburetor for an internal combustion engine is contemplated that includes a slide assembly movably disposed in the body for movement across the throat portion. The slide assembly includes a throttle slide having a metering rod bore and a positioner bore. A metering rod extends through the metering rod bore and across the throat portion into the fuel reservoir. The slide assembly includes a positioning mechanism operative to adjust the position of the metering rod relative to the throttle slide. The positioning mechanism includes a barrel rotatably disposed in the positioner bore. The barrel is threadably engaged with the metering rod such that rotation of the barrel adjusts the position of the metering rod.

The barrel includes a detent for selectively indexing the barrel in one of a plurality of rotational positions. The detent is operative to engage one of a plurality of indentations located at the bottom of the positioner bore. The indentations may be formed in the bottom of the positioner bore or formed in a detent washer disposed in the bottom of the positioner bore, as examples.

In yet another embodiment, a carburetor for an internal combustion engine is contemplated that includes a throttle slide having an outlet gate and an inlet gate including a flow guide disposed on the inlet gate in alignment with the metering rod. The flow guide bisects an arcuate relief on an underside of the inlet gate thereby forming a pair of funnel-shaped grooves. The arcuate relief may be frusto-conical in configuration and the flow guide may be in the form of a pyramid shaped point. Furthermore, the throttle slide may include a stepped portion disposed on the inlet gate for accelerating an airflow past a lower end of the throttle slide.

A method for configuring the throat of a carburetor to optimize airflow to an engine is also contemplated. Where the carburetor includes an upper portion of a first diameter and a lower portion of a second diameter that is offset from the first diameter, the method comprises deriving an optimum size for the first and second diameters and the offset based on mass airflow requirements of an engine. Broadly, the method comprises determining the venturi flow coefficient ($C_v$) of the carburetor and determining the mass airflow requirements ($\dot{m}$) of the engine. The optimum size for the first and second diameters and the offset are derived based on the mass airflow requirements and venturi flow coefficient. Both the venturi flow coefficient and the mass airflow requirements may be determined experimentally. In addition, determining the mass airflow requirements of the engine may include measuring the pressure differential ($\Delta P$) and the air density ($\rho$).

The method includes resolving the width (w) as a function of throttle slide position (y) according to the equation $$w(y) = \frac{d}{d\gamma}\left[\frac{\dot{m}}{C_v\sqrt{2\rho\Delta P}}\right].$$

The optimum size for the first diameter ($\varnothing_1$) is selected to match the width ($w_{wot}$) at a wide open throttle slide position ($y_{wot}$). The optimum size for the second diameter ($\varnothing_2$) is selected to match the width ($w_i$) at an idle throttle slide position ($y_i$). The optimum offset (X) is the difference between the wide open throttle slide position ($y_{wot}$) and the idle throttle slide position ($y_i$).

DETAILED DESCRIPTION

Basic carburetor design is generally well known to those of ordinary skill in the art. For example, a suitable carburetor to which the present improvements may be applied is described in U.S. Pat. No. 6,505,821 issued Jan. 14, 2003 to Edmonston, the disclosure of which is hereby incorporated by reference in its entirety.

Figure 1:
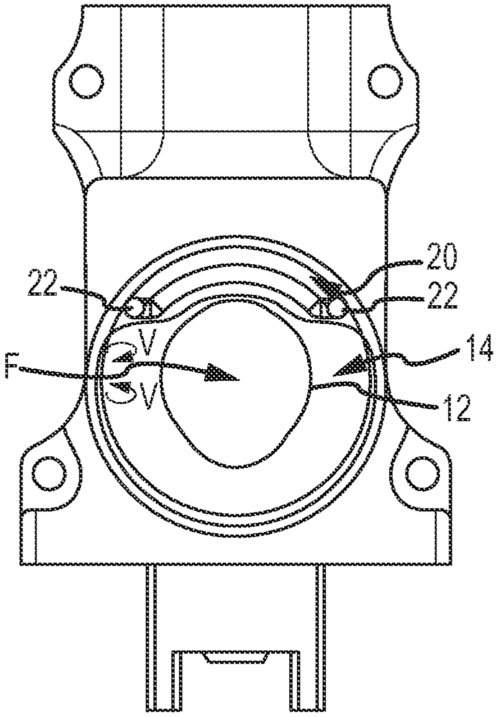
FIG. 1 is a front view in elevation of the carburetor illustrating the flow geometry of the inlet opening portion according to an exemplary embodiment.
Figure 2:
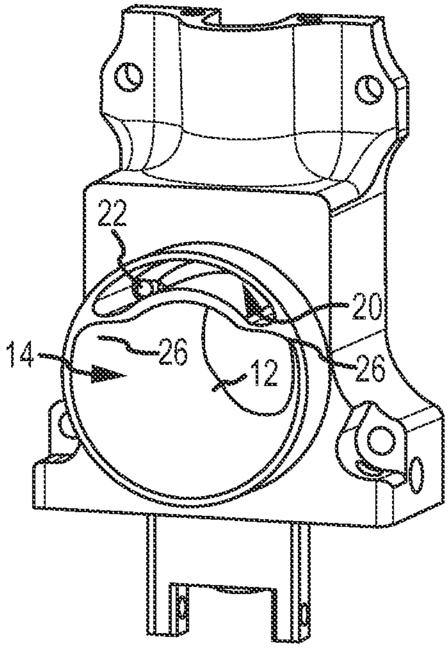
FIG. 2 is a perspective view of the inlet of the carburetor shown in FIG. 1.

FIGS. 1 and 2 illustrate flow geometry designed to concentrate flow near the carburetor's metering rod 10 (see FIGS. 3 and 4) and encourage mixing. The entrance 14 to the throat 12 (known as the bell) includes features to direct flow "F" toward the metering rod 10 and induces a set of secondary vortical structures "V" which increase turbulence intensity and promote mixing. The concavities 26 begin near the upper and outer portion of the venturi and extend downward while turning inward as they approach the flow restriction created by the slide assembly 16. Momentum is carried along the primary curvature of the concavity and collides near the metering rod 10. The flow concentration in the center of the bore helps to minimize the buildup of liquid boundary layers, increases vacuum on the flat (not shown) of the metering rod to draw fuel, and increases shear forces within the flow to force fuel into increasingly smaller droplets. The secondary flow forms two weak, counter-rotating vortices, normal to the primary streamline. The cross-flow momentum helps to mix fuel across streamlines and creates a more uniform mixture.

Figure 3:
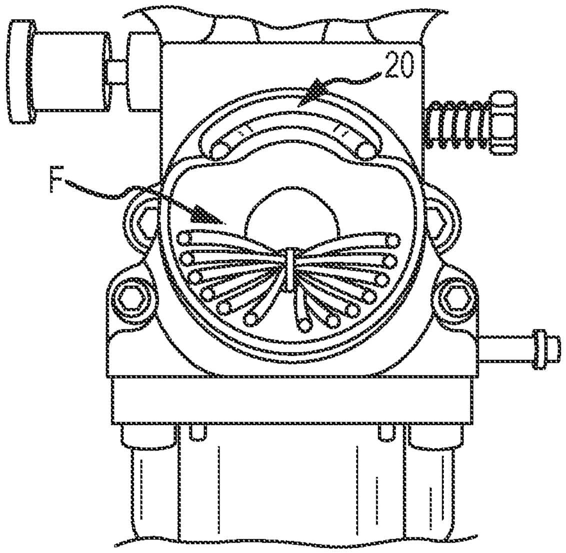
FIG. 3 is a front view of the carburetor illustrating flow characteristics of the inlet opening portion with the throttle slide at partial open throttle.
Figure 4:
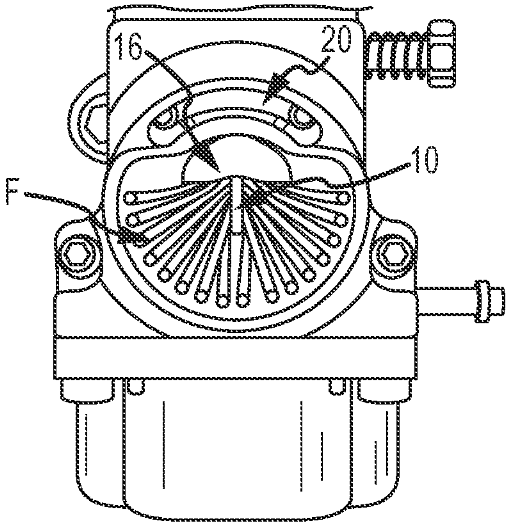
FIG. 4 is a front view of the carburetor illustrating flow characteristics of the inlet opening portion similar to FIG. 3 with the throttle slide at a further open position.
Figure 5:
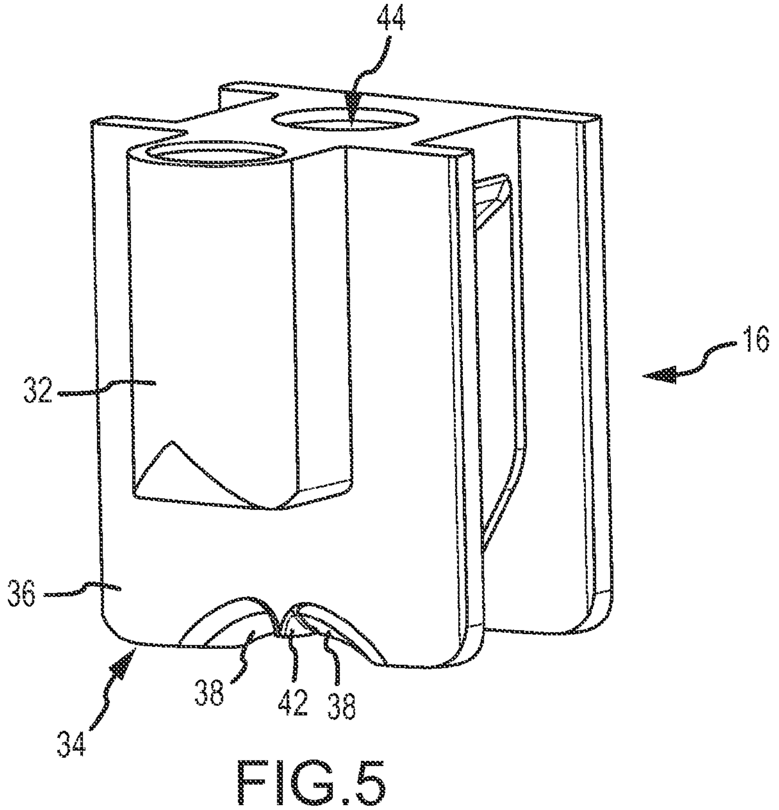
FIG. 5 is a perspective view of the throttle slide according to an exemplary embodiment.
Figure 6:
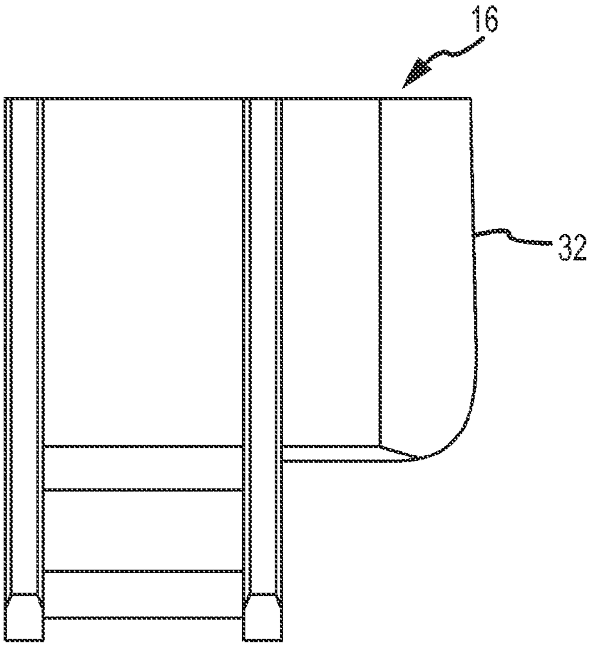
FIG. 6 is a side view in elevation of the throttle slide shown in FIG. 5.
Figure 7:
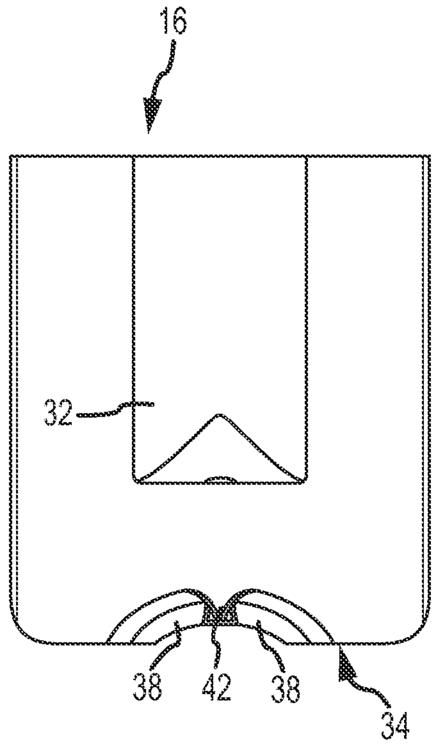
FIG. 7 is a front view in elevation of the throttle slide shown in FIGS. 5 and 6.
Figure 8:
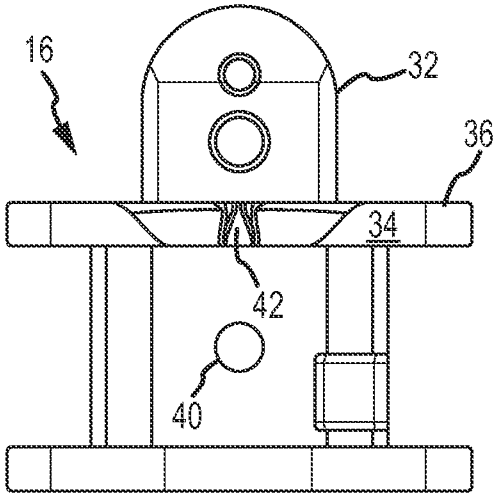
FIG. 8 is a bottom plan view of the throttle slide shown in FIGS. 5-7.

FIGS. 3 and 4 illustrate the vortical flow "F" of air entering the bell, or inlet portion, at different throttle slide positions. FIG. 3 illustrates vortical flow with a small throttle slide opening, such as would be expected at engine idle speeds. FIG. 4, on the other hand, illustrates vortical flow of air entering the bell at a larger throttle slide opening, such as at mid-throttle.

The carburetor, shown in FIGS. 1-4, also includes a manifold 20 designed to maintain a steady atmospheric pressure on the fuel in the float bowl. In this case, manifold 20 is in the form of an arcuate scoop. Steady pressure on the float bowl generates uniform fuel flow and efficient mixing of the fuel with incoming air. The manifold 20 is located in the upper portion of the air inlet adjacent to and extending along a portion of a peripheral margin of the inlet opening portion. The manifold serves to trap the air in a relatively stagnant, non-turbulent state at the entrance to the inlet openings 22 to maintain a constant pressure on the fuel in the float bowl.

The geometry of the manifold 20 may be altered to change some characteristics of the carburetor performance. Turbulent flow enters the manifold and comes to rest. It is this conversion of dynamic pressure into static pressure that applies compensating pressure on top of the fuel reservoir. Both the volume and depth of the manifold are elements that damp oscillations in the flow. The length and diameter of the passages 22 leading to the fuel reservoir are of an appropriate ratio to allow viscosity to dominate the fuel driving pressure. The damping acts only upon the transient pressures encountered by the manifold.

FIGS. 5-8 illustrate the flow-modifying geometry applied to the front gate of the slide assembly, which improve the atomization and metering characteristics of the carburetor. The slide assembly 16 includes a stepped portion 32 upstream of the throat for concentrating and compressing the air entering the throat. The stepped portion 32 forces air entering from the inlet to compress before going under the slide assembly, thereby increasing the velocity of the airflow past the slide and fuel outlet. This is especially effective for the thorough mixing of incoming fuel and air and efficient burning of the fuel-air mixture at low settings of the carburetor.

Figure 9:
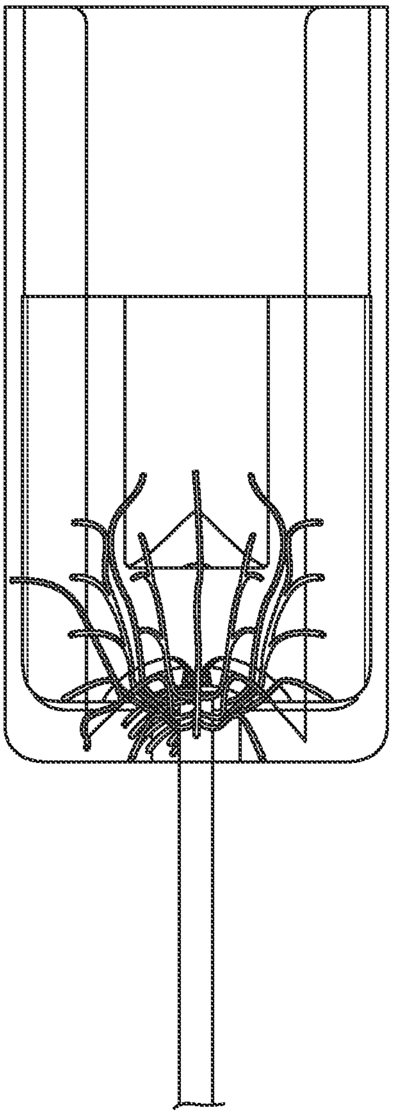
FIG. 9 is a front view of the throttle slide illustrating the pressure changes as airflow enters the carburetor.
Figure 10:
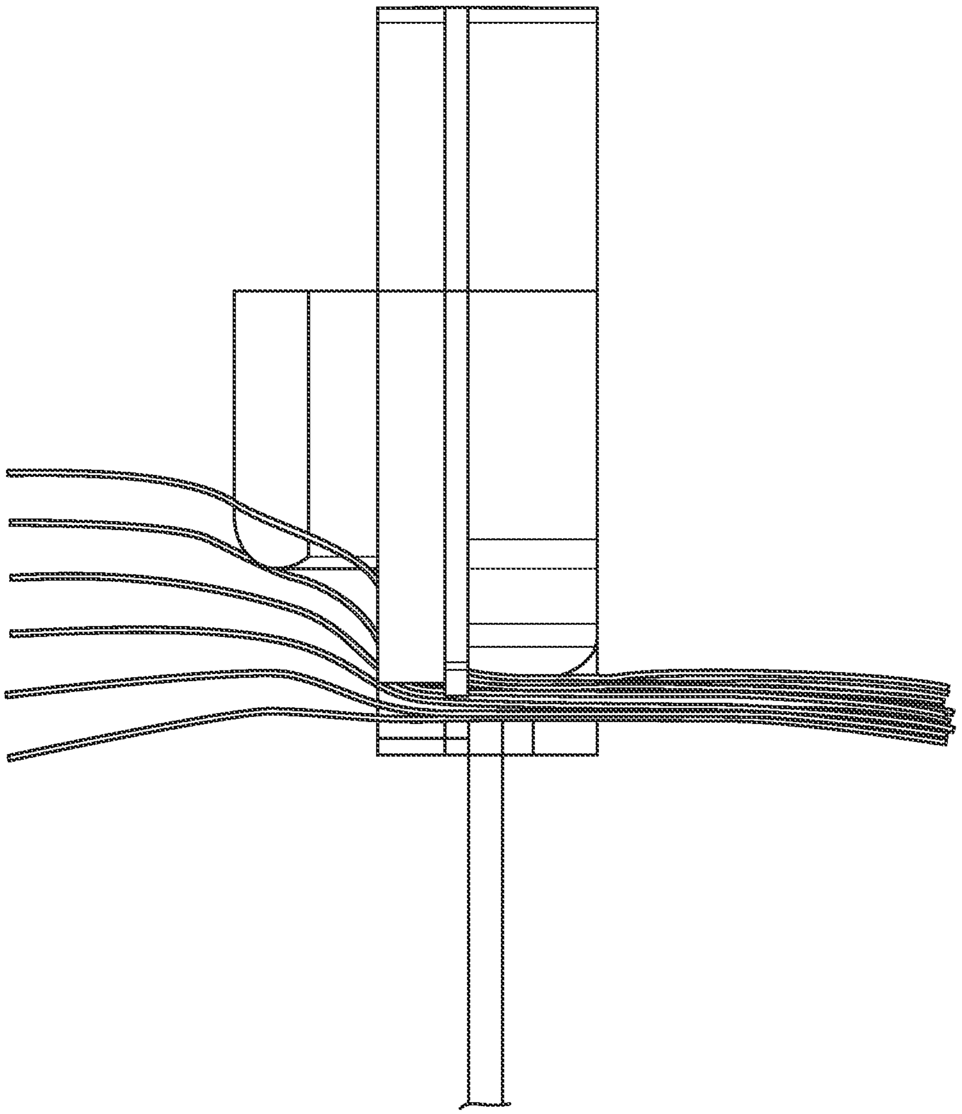
FIG. 10 is a side view of the throttle slide illustrating the pressure changes across the throat of the carburetor.

The underside 34 of the forward gate 36 of the slide includes two funnel-shaped grooves 38 placed directly to either side of the metering rod location 40. The material between the grooves forms a frenulum or flow guide 42, in the form of a pyramid shaped point or chevron, leading into the flow. The flow guide bisects an arcuate relief on the underside of the inlet gate thereby forming a pair of funnel-shaped grooves. The arcuate relief is preferably frusto-conical in configuration. Flow guide 42 causes the metering rod to appear to have a teardrop-shape within the flow at low throttle position. The funnel-shaped grooves 38 allow air to accelerate to their highest velocity more near to the metering portion of the venturi increasing atomization. Flow separation and the orthogonal surface vector of the feature reduce lift on the slide, which may cause undesirable fluctuations in the fuel delivery. This design has been shown to improve function in the form of lower NOx emissions and a resistance to slide float. FIGS. 9 and 10 are computational fluid dynamic (CFD) vector plots illustrating the flow characteristics of the frenulum.

With reference to FIGS. 11A-12B, throat 12 includes a lower portion 15 that is narrower in width than the upper portion 13. Lower portion 15 is operative to accelerate airflow past the lower end of the throttle slide 16 at part throttle for the purpose of amplifying the signal at the metering rod 10. As the throttle slide 16 is opened further, the larger upper portion 13 is exposed to provide increased airflow to the engine at higher engine speeds and/or loads.

In one embodiment, the geometry of the throat 12 includes an upper portion 13 of a first diameter and a lower portion 15 of a second diameter that is offset a distance "X" from the first diameter. The sizes of the circle(s) determine the throttle bore size.

Figure 11A:
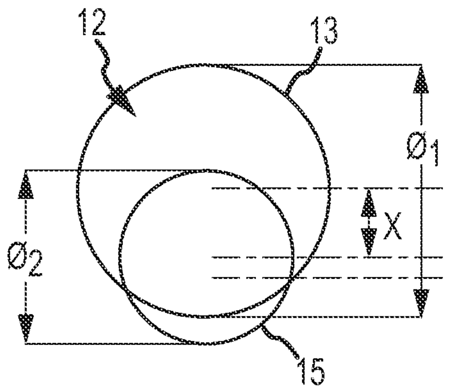
FIG. 11A is a schematic diagram of the throat portion of the carburetor illustrating the upper and lower portions.
Figure 11B:
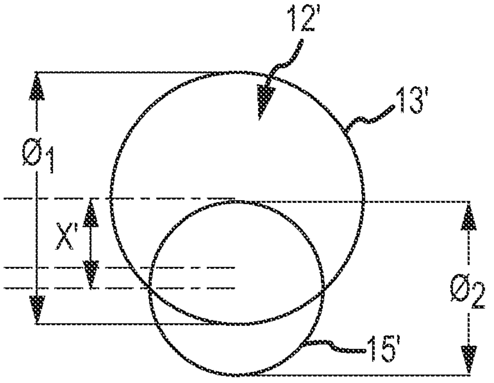
FIG. 11B is a schematic diagram of the throat portion similar to FIG. 11A, illustrating a variation in the offset of the upper and lower portions.
Figure 12A:
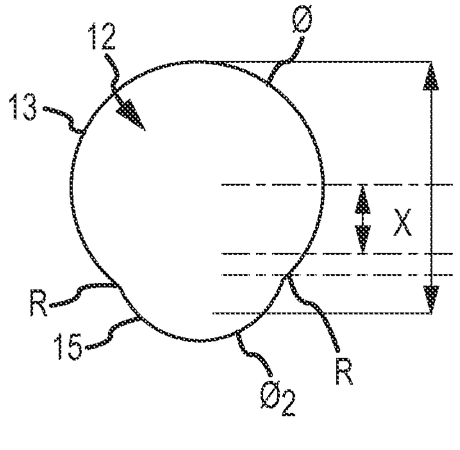
FIG. 12A is a schematic diagram corresponding to FIG. 11A showing an exemplary throat portion profile.
Figure 12B:
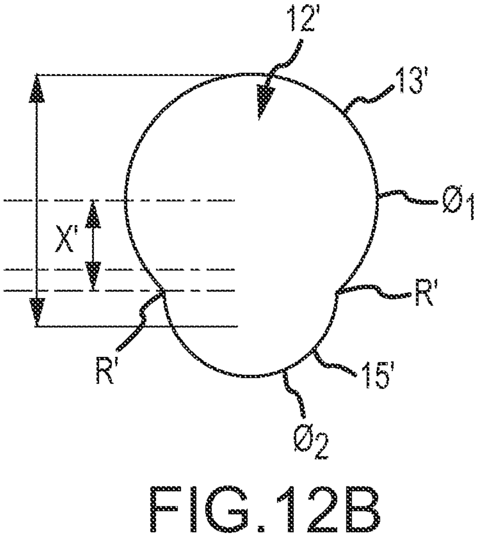
FIG. 12B is a schematic diagram corresponding to FIG. 11B showing an alternate exemplary throat portion profile.

FIG. 11A illustrates an example of a geometry configuration for throat 12 having a first diameter ($Ø_1$) equal to 3.40 cm and a second diameter ($Ø_2$) equal to 2.35 cm with an offset "X" between the first and second diameters. FIG. 11B illustrates another example of geometry configuration for throat 12'. In this example, the first and second diameters are the same as in FIG. 11A; however, the offset distance "X'" has been increased. The larger offset distance "X'" provides a more progressive transition between idle and wide open throttle, which is suitable for a 4-stroke engine, for example. FIG. 11A illustrates geometry that is better suited to a 2-stroke engine and provides a more abrupt transition between idle and wide open throttle or near wide open throttle. As can be appreciated in FIGS. 12A and 12B, the two diameters corresponding to upper and lower portions 13 and 15, respectively, are smoothed together by a radius "R" to provide a smooth air intake surface.

Methods for configuring the throat of a carburetor, such as described above, are also contemplated. The geometry ($Ø_1$, $Ø_2$, X) of throat 12 may be optimized to improve airflow to an engine depending on the engine parameters. Several parameters of carburetor design may be optimized in a prescribed fashion to achieve the highest atomization efficiency and flow for improved performance of an internal combustion engine.

Generally, the method uses the mass airflow requirements ($\dot{m}$) for a particular engine to define the carburetor venturi profile. The mass airflow requirements ($\dot{m}$) are obtained by direct measurement and isolation of the air delivery requirements of a particular engine. The airflow requirements are combined with carburetor venturi flow coefficients ($C_v$) to define the required throat or venturi area ($A_v$) as a function of throttle slide position.

Regarding measurement of the mass airflow requirements ($\dot{m}$), piston engines, both two-cycle and four-cycle, consume air as part of an unsteady process. Air metering technology is not optimally suited for net mass flow measurement of this unsteady flow. It is advantageous to damp out these perturbations and flow reversions in the case of some two-cycle engines in order to support accurate measurements. Accordingly, the inlet port of the engine is ducted to a vessel of sufficient volume to suppress the effects of unsteady pumping action such that the volume of the vessel is much greater than the displacement of the engine. The vessel is then supplied air at a pressure equivalent to atmospheric or desired conditions by a rotary style blower, for example. Mass flow of air ($\dot{m}$) is measured at the intake of the blower which provides a smooth continuous flow.

Once mass flow ($\dot{m}$) is determined as a function of engine speed and load, the carburetor venturi cross section is calculated. Using the incompressible form of Bernoulli's equation and one-dimensional continuity equation, an equation for ideal mass flow rate can be shown.

$$\dot{m}=A_v\sqrt{2\rho\Delta P}$$

$\dot{m}$=Mass Flow Rate of Air $A_v$=Area of Carburetor Venturi, where $A_v$=f(Slide Position)

$\rho$=Air Density $\Delta P$=Static Pressure Differential of Venturi to Atmosphere Geometry, turbulence, and viscous effects all contribute to reduce the mass flow rate below indicated by the ideal expression. For standard venturi tube profiles, flow coefficients are experimentally determined and included in the mass flow equation. A flow coefficient ($C_v$) specific to the subject carburetor is similarly determined by experimentation. This coefficient is itself a function of area ratio or slide position, density, and pressure differential. The modified equation is shown below:

$$\dot{m}=A_vC_v\sqrt{2\rho\Delta P}$$

$C_v$=f($\rho$, $\Delta P$, slide position)

The mass flow rate ($\dot{m}$), pressure differential ($\Delta P$), and venturi flow coefficient ($C_v$) are all determined by experimentation as described above, while the density ($\rho$) is measured directly from the environment. The mass flow equation can then be solved, as described more fully below, to give an expression for area ($A_v$) as a function of throttle position (y).

$$A_v=\frac{\dot{m}}{C_v\sqrt{2\rho\Delta P}}$$

Figure 14:
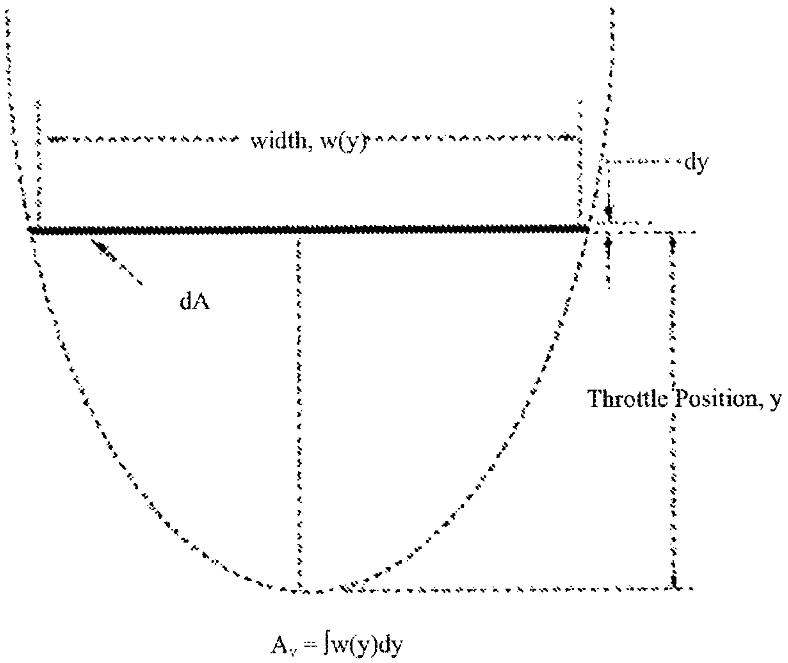
FIG. 14 is a schematic diagram of the area of a revealed shape according to an alternative embodiment.
Figure 15:
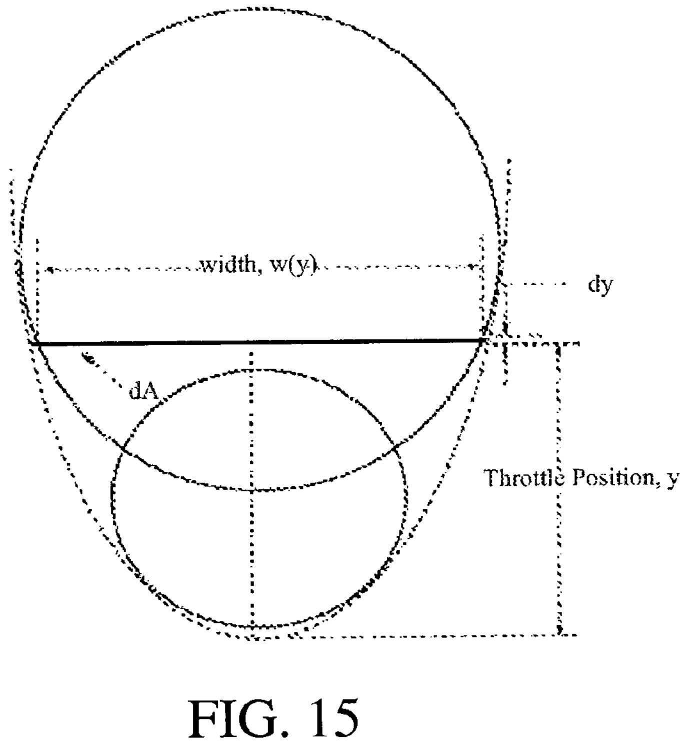
FIG. 15 is a schematic diagram of a throat geometry approximation shape according to yet another alternative embodiment.

For an arbitrary venturi profile, the area of the revealed shape can be described in relation to the shapes in FIGS. 14 and 15.

Combining the mass flow rate equation with the area integral, and solving for the width (w) returns the following expression.

$$w(y)=\frac{d}{dy}\left[\frac{\dot{m}}{C_v\sqrt{2\rho\Delta P}}\right]$$

This equation for width (w) as a function of throttle position (y) describes the venturi geometry. As can be appreciated with reference to the integral below, the ideal throat 12 geometry is approximated with two diameters ($Ø_1$, $Ø_2$) separated by a distance (X).

By matching the throat cross section to the engine's characteristics, combustion is improved by improved flow, increased atomization, and consistent fuel delivery. Furthermore, a carburetor tailored, according to the above defined method, will deliver a fuel mixture that is more uniform and consistent and provides a progressive, linear throttle response to the user.

Figure 13:
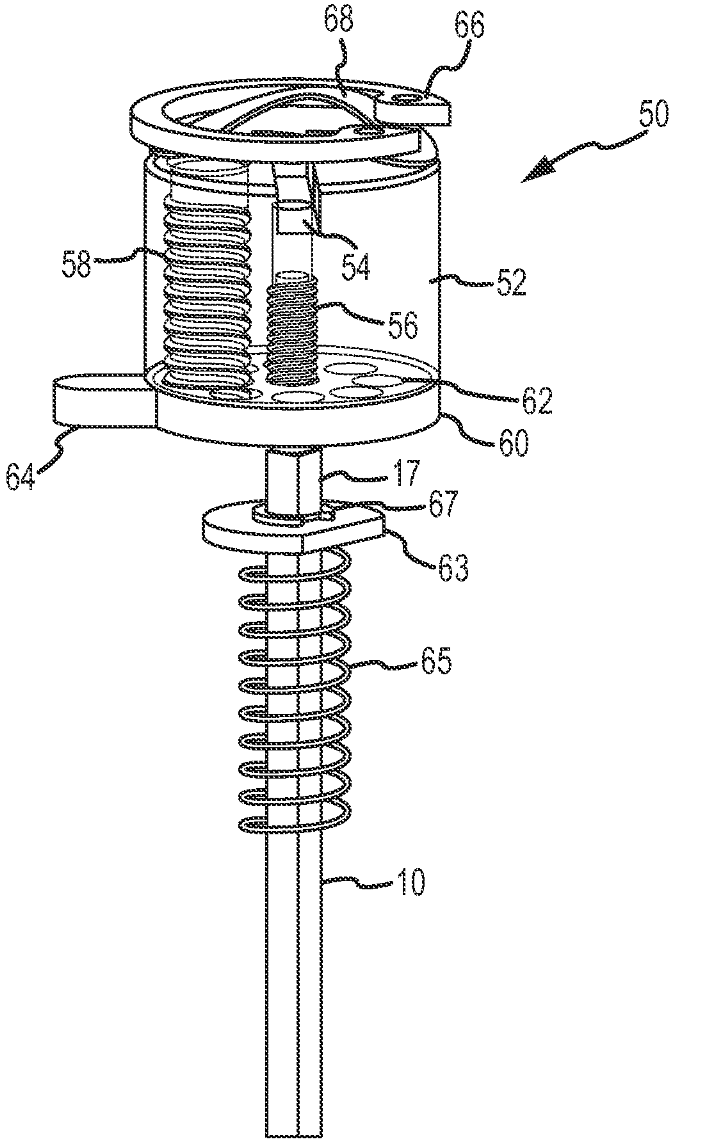
FIG. 13 is a partial perspective view of the metering rod positioning mechanism according to an exemplary embodiment.

Turning now to FIG. 13, an exemplary metering rod positioning mechanism 50 is described. As is known in the art, adjusting the position of the metering rod 10 relative to the throttle slide 16 acts to enrich or lean the mixture of air and fuel delivered to an engine. Positioning mechanism 50 actuates the metering rod 10 independently from the slide assembly 16. A cylinder or barrel 52 has a thread 56 through the center to accept the metering rod 10. As the barrel 52 is indexed rotationally, threaded contact alters the axial position of the metering rod 10. Barrel 52 includes a spring plunger 58 that is threadably engaged with the barrel 52. The spring plunger or detent 58 is operative to engage one of a plurality of indentations or divots 62. Thus, the barrel 58 may be selectively indexed into one of the rotational positions and wherein the detent 58 maintains the barrel position until readjusted. Barrel 52 is received in positioner bore 44 (See FIG. 5). Indentations 62 may be formed in the bottom of bore 44 or may be formed into a separate detent washer 60 disposed in the bottom of bore 44. Detent washer 60 may also include a tab 64 to maintain its angular position relative to the slide assembly. Barrel 52 is retained in bore 44 with a snap ring 66 and a wave washer 68. In this case, barrel 52 includes a slot 54 to allow rotational adjustment of the barrel with a suitable tool, such as a screw driver.

Metering rod 10 is fashioned with a flat 17 to engage a D-shaped washer 63 that is fixed in position by a spring tension from below (spring 65) and a retaining ring 63 from above. The D-shaped washer 63 engages a contour (not shown) within the slide assembly 16 to maintain the angular orientation of the metering rod 10 with respect to the throttle slide 16 and throat portion 12.

Accordingly, the carburetor and methods, therefore, have been described with some degree of particularity directed to the exemplary embodiments. It should be appreciated, though, that the present invention is defined by the following claims construed in light of the prior art so that modifications or changes may be made to the exemplary embodiments without departing from the inventive concepts contained herein.

What is claimed is:

1. A carburetor for an internal combustion engine, comprising:

a body having an air inlet opening portion, an air outlet opening portion, and a throat portion extending therebetween;

a fuel reservoir in fluid communication with the throat portion;

a slide assembly movably disposed in the body for movement across the throat portion, wherein the slide assembly includes a throttle slide and a metering rod extending across the throat portion and into the fuel reservoir;

wherein the air inlet opening includes a manifold adjacent to and extending along a portion of a peripheral margin of the inlet opening portion, the manifold being in fluid communication with the fuel reservoir; and wherein the manifold has a volume that is proportional to the cross-sectional area of the throat portion.

2. The carburetor of claim 1, wherein the throat portion includes upper and lower portions, and wherein the manifold is adjacent the upper portion.

3. The carburetor of claim 1, wherein the air inlet opening includes a pair of concavities operative to direct an airflow toward the metering rod that are located proximate either end of the manifold.

4. The carburetor of claim 3, wherein the concavities begin near a peripheral margin of the inlet opening portion and extend inward as the concavities approach the throat portion.

5. A carburetor for an internal combustion engine, comprising:

a body having an air inlet opening portion, an air outlet opening portion, and a throat portion extending therebetween;

a fuel reservoir in fluid communication with the throat portion; and a slide assembly movably disposed in the body for movement across the throat portion, wherein the slide assembly includes:

a throttle slide including a metering rod bore and a positioner bore;

a metering rod extending through the metering rod bore, across, the throat portion, and into the fuel reservoir; and a positioning mechanism operative to adjust the position of the metering rod relative to the throttle slide, the positioning mechanism including:

a barrel rotatably disposed in the positioner bore, said barrel being threadably engaged with the metering rod such that rotation of the barrel adjusts the position of the metering rod.

6. The carburetor of claim 5, wherein the barrel includes a detent for selectively indexing the barrel in one of a plurality of rotational positions.

7. The carburetor of claim 6, wherein the detent is operative to engage one of a plurality of indentations located at the bottom of the positioner bore.

8. The carburetor of claim 7, wherein the plurality, of indentations are formed in a detent washer disposed in the bottom of the positioner bore.

9. A carburetor for an internal combustion engine, comprising:

a body having an air inlet opening portion, an air outlet opening portion, and a throat portion extending therebetween;

a fuel reservoir in fluid communication with the throat portion; and a slide assembly movably disposed in the body for movement across the throat portion, the slide assembly including:

a metering rod extending across the throat portion and into the fuel reservoir; and a throttle slide having an outlet gate and an inlet gate including a flow guide disposed on the inlet gate in alignment with the metering rod wherein the flow guide bisects an arcuate relief on an underside of the inlet gate thereby forming a pair of funnel-shaped grooves.

10. The carburetor of claim 9, wherein the arcuate relief is frusto-conical in configuration.

11. The carburetor of claim 10, wherein the flow guide is in the form of a pyramid-shaped point.

12. The carburetor of claim 10, including a stepped portion disposed on the inlet gate for accelerating an air flow past a lower end of the throttle slide.

13. A throttle slide for a carburetor, comprising:

an outlet gate;

an intermediate portion including a metering rod bore; and an inlet gate including a flow guide disposed on the inlet gate in alignment with the metering rod bore, wherein the flow guide bisects a frusto-conical relief on an underside of the inlet gate thereby forming a pair of funnel-shaped grooves.

14. The throttle slide of claim 13, wherein the flow guide is in the form of a pyramid-shaped point.

15. The throttle slide of claim 13, including a stepped portion disposed on the inlet gate for accelerating an air flow past a lower end of the throttle slide.

* * * * *